US012212947B2

(12) United States Patent
Eubank et al.

(10) Patent No.: US 12,212,947 B2
(45) Date of Patent: Jan. 28, 2025

(54) SPLITTING A VOICE SIGNAL INTO MULTIPLE POINT SOURCES

(71) Applicant: Apple Inc., Cupertino, CA (US)

(72) Inventors: Christopher T. Eubank, Santa Barbara, CA (US); Camellia G. Boutros, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 17/962,935

(22) Filed: Oct. 10, 2022

(65) Prior Publication Data

US 2023/0143473 A1 May 11, 2023

Related U.S. Application Data

(60) Provisional application No. 63/278,265, filed on Nov. 11, 2021.

(51) Int. Cl.
*H04S 1/00* (2006.01)
*H04S 7/00* (2006.01)

(52) U.S. Cl.
CPC ................ *H04S 1/002* (2013.01); *H04S 7/30* (2013.01); *H04S 2400/07* (2013.01); *H04S 2400/11* (2013.01)

(58) Field of Classification Search
CPC ........ H04S 1/002; H04S 7/30; H04S 2400/07; H04S 2400/11
See application file for complete search history.

(56) References Cited

U.S. PATENT DOCUMENTS

2020/0221248 A1* 7/2020 Eubank .................. H04S 3/008

FOREIGN PATENT DOCUMENTS

WO 2019121864 A1 6/2019
WO 2020206177 A1 10/2020
WO WO-2023076823 A1 * 5/2023 ............ H04S 7/304

OTHER PUBLICATIONS

Monson, Brian B., et al., "Horizontal directivity of low- and high-frequency energy in speech and singing," J. Acoust. Soc. Am. 132 (1), Jul. 2012, pp. 433-441.

Toole, Floyd E., "Loudspeakers and Rooms for Sound Reproduction—A Scientific Review," J. Audio Eng. Soc., vol. 54, No. 6, Jun. 2006, pp. 451-476.

* cited by examiner

*Primary Examiner* — David L Ton
(74) *Attorney, Agent, or Firm* — Aikin & Gallant, LLP

(57) ABSTRACT

In a method for reproducing sound of a data object, a voice signal of a data object is split into a first sub-band signal and a second sub-band signal, and speaker driver signals are generated to produce sound of the object by a two-way speaker system in which the first sub-band signal drives a tweeter or high frequency driver and the second sub-band signal drives a woofer or low frequency driver. In another aspect, the first and second sub-band signals are spatialized as virtual sources that are in different locations. Other aspects are also described and claimed.

21 Claims, 2 Drawing Sheets

SPLITTING A VOICE SIGNAL INTO MULTIPLE POINT SOURCES

FIELD

An aspect of the disclosure here relates to spatializing sound. Other aspects are also described and claimed.

BACKGROUND

Spatial audio rendering (spatializing sound) may be described as the electronic processing of an audio signal (such as a microphone signal or other recorded or synthesized audio content) to generate multi-channel speaker driver signals that produce sound which is perceived by a listener to be more real. For example, a voice signal (of a person talking) may be electronically processed to generate a virtual, point source (of the person's voice) that is perceived by the listener to be emanating from a given location that is to the right or to the left of the listener for example, instead of straight ahead or equally from all directions. Such sound is produced by a spatial audio rendering algorithm that is driving a multi-channel speaker setup, e.g., stereo loudspeakers, surround-sound loudspeakers, speaker arrays, or headphones,

SUMMARY

An aspect of the disclosure here is a computer-implemented method for reproducing the sound of a data object that may yield a more real listening experience. An audio signal that represents sound of the data object is received by a sound engine. The object includes a visual element to be displayed, e.g., a simulated reality object such as an avatar. The sound engine splits the audio signal into two or more sub-band audio signals including a first sub-band and a second sub-band. The first sub-band may be assigned to a first location in the visual element, and the second sub-band may be assigned to a second location in the visual element that is spaced apart from the first location. A number of speaker driver signals are generated using the sub-band signals, to produce the sound of the object.

In one aspect, this is done by processing the sub-band audio signals, e.g., separately spatializing each sub-band signal, so that sound in the first sub-band emanates from a different location than sound in the second sub-band. Thus, taking a voice signal as an example, the voice signal from a single, virtual point source (on a virtual mouth) is split into two frequency domain or sub-band components assigned to two virtual point sources, respectively, one in the mouth and one in the chest. The mouth sub-band may be in a higher frequency range than the torso sub-band. The speaker driver signals may be binaural left and right headphone driver signals, for driving a headset worn by the listener, or they may be loudspeaker driver signals for a stereo or a surround sound loudspeaker system.

In another aspect, the speaker driver signals may be high frequency and low frequency signals intended for driving the tweeter and the woofer, respectively, of a 2-way speaker system.

In another aspect, one or more cut off frequencies that define the sub-bands are set, based on an acoustic characteristic, e.g., volume or size, of a room. The volume of the room may be used to determine at what frequency does sound diffuse around the room, versus how directional the sound is. The cut off frequency that demarcates the boundary between a low sub-band and a high sub-band may thus change depending on the size of the room.

The room may be a virtual room, and a visual element of the object is in the virtual room while both are presented on a display. The listener may be watching the display and wearing a headset (through which the sound of the object is being reproduced.) Alternatively, the room may be a real room in which the listener of the reproduced sound is located, and the listener is wearing a headset while looking through an optical head mounted display in which the object is being presented (as in an augmented reality environment.)

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
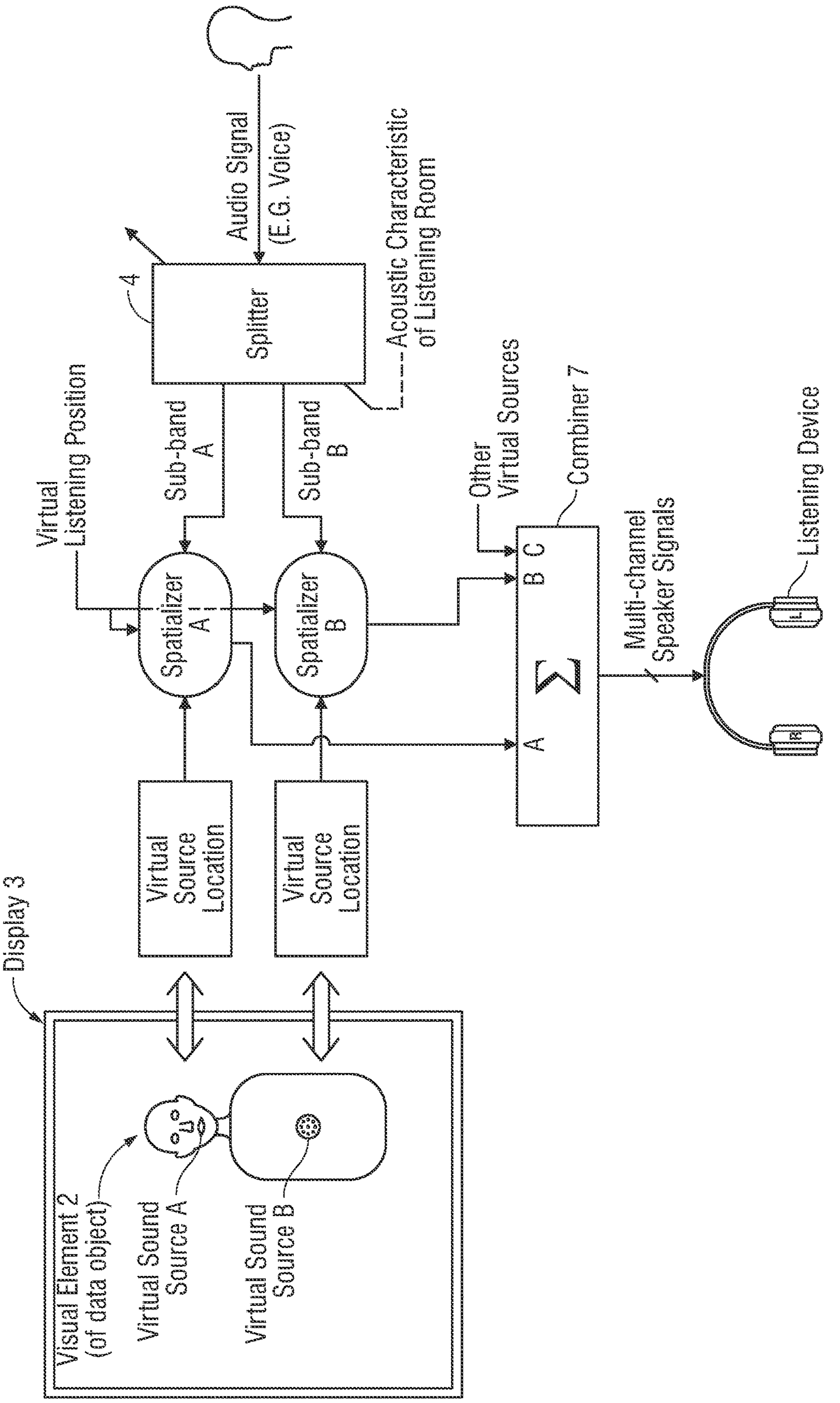
FIG. 1 is a block diagram of an audio system that splits an input audio signal that is associated with a visual element of a data object into at least two virtual sound sources and spatializes each source separately.

One aspect of the disclosure is FIG. 1, which is a block diagram of an audio system that splits an input audio signal that is associated with a visual element of a data object into at least two virtual sound sources and spatializes each source separately. The system is described here by way of method operations that are performed by a data processor of the system (a computer-implemented method), for spatializing the sound of the data object. The data processor may be configured by software (instructions stored in machine-readable memory) such as application development software or a simulated reality application that is being authored using the application development software.

The input audio signal (e.g., a monaural signal) is associated with or represents the sound of a data object which is represented by a visual element 2, such as in a simulated reality application program. The visual element 2 of the data object appears on a display 3 after having been rendering by a video engine (not shown.) The visual element 2 may be a graphical object area (e.g., drawn on a 2D display) or it may be a graphical object volume (e.g., drawn on a 3D display) of the data object. The data object may be for example a person and the visual element 2 is an avatar of the person, depicted in FIG. 1 as having a head and a torso. The audio signal represents sound of the data object, which in the example of a person is the person's voice.

The audio system renders a single input audio signal as two or more virtual sound sources or point sources, as follows. A splitter 4 splits the audio signal into two or more sub-band audio signals (components of the input audio signal), including a first sub-band (sub-band A) and a second sub-band (sub-band B.) The splitter may be implemented for example as a filter bank. The sub-band A may be in a higher frequency range of the human audible range than the sub-band B. As an example, the low frequency band (sub-band B) may lie within 50 Hz-200 Hz. In another example, the low frequency band lies within 100 Hz-300 Hz. The high frequency band may lie above those ranges.

The sub-band A is assigned to a first location in the visual element, which is within the area or volume of the visual element, while the second sub-band is assigned to a second location in the visual element that is spaced apart from the first location (but that is also within the area or volume of the visual element.) As seen in the figure, sub-band A is spatialized as a virtual sound source A or a point source that is located at the person's or avatar's head or mouth, while sub-band B is spatialized as a virtual sound source B located at the person's or avatar's torso. The system generates a set of multi-channel speaker driver signals (two or more speaker driver signals) that drive a listening device to produce the sound of the data object, by processing the two sub-band audio signals and their associated metadata that includes their respective virtual source locations, so that sound of the sub-band A emanates from a different location than sound of the sub-band B. Note here that the location of a virtual sound source may be equivalent to an azimuthal direction or angle, and an elevation direction or angle, for example as viewed from the virtual listening position.

In the example of FIG. 1, the sub-bands A, B are spatialized separately which is depicted by two spatializer blocks A, B that receive as inputs the same virtual listening position but different virtual source locations, and different audio signals. The outputs of the spatializers A, B are combined by a combiner 7 (depicted by a summation symbol) with the outputs of one or more other spatializers C, . . . so that the multi-channel speaker signals contain a sound scene that may have other virtual sound sources C, . . . . In the example shown, the multi-channel speaker signals are binaural signals that drive a left speaker and a right speaker of a headset, although in other versions the listening device may be different, e.g., a pair of loudspeakers, a 5.1 surround sound loudspeaker arrangement.

FIG. 1 is also used to illustrate another aspect of the disclosure here, where the splitter 4 is controlled by an acoustic characteristic of a room. The room may be virtual room in which the data object (its visual element 2) is being presented on the display 3. Alternatively, the room may be a real room in which a listener of the spatialized sound is located. In that case, the listening device may be a headset that is being worn by the listener, and the listener can look through an optical head mounted display (also worn by the listener) into the real room while the visual element 2 of the data object is being presented in the display 3, overlaying the real room as in an augmented reality environment. In both cases, the processor may set one or more cut off frequencies of the sub-band audio signals based on the acoustic characteristic of the room. The acoustic characteristic of the room may be for example a function of any one or more of room size or volume (e.g., large vs small), reverberation time, sound absorption properties, and room impulse response.

Figure 2:
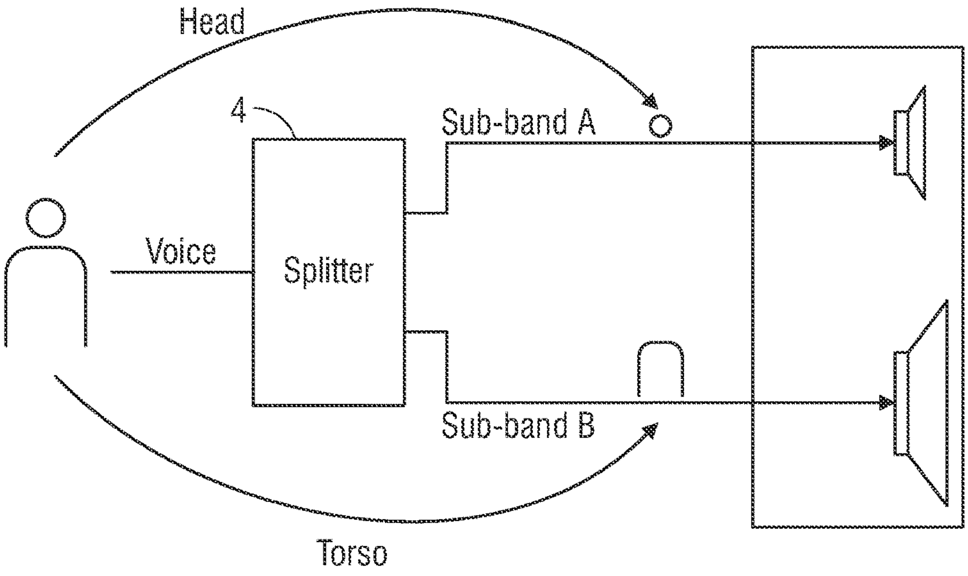
FIG. 2 is a block diagram of an audio system that splits an input voice signal and reproduces the voice through low and high frequency speaker drivers.

Turning now to FIG. 2, this is a block diagram of an example computer system in which the audio signal is a voice signal. The voice signal is an audio signal whose content is primarily or predominantly speech of a person, e.g., a recording that is may be part of a dialog. As such the voice signal does not contain music or effects. The voice signal is associated with the visual element 2 being an avatar of a data object, such as in a simulated reality application program for instance. In this system, as in the one of FIG. 1, the data processor is configured to perform as the splitter 4 which splits the voice signal into at least two components, e.g., a first sub-band signal in a first sub-band A, and a second sub-band signal in a second sub-band B. It then generates multiple speaker driver signals, in this case a tweeter signal (for driving a tweeter represented as the smaller speaker symbol), and a woofer signal (for driving a woofer represented as the larger speaker symbol.) The tweeter and woofer form a 2-way speaker system (e.g., integrated into the same housing of the listening device.) Thus, rather than performing as a spatializer that spatializes the two sub-bands separately, the processor in FIG. 2 causes the sound in the first sub-band A to emanate from a tweeter of the listening device, and the sound in the second sub-band B to emanate from a woofer of the listening device. The first sub-band A is a high frequency band and the second sub-band B is a low frequency band, where the high frequency band is above the low frequency band. Examples of these frequency bands are as given above in connection with the description of FIG. 1. Also, FIG. 2 may be modified by the addition of the feature described above in connection with FIG. 1 in which the splitter 4 is controlled by an acoustic characteristic of a room.

Figure 3:
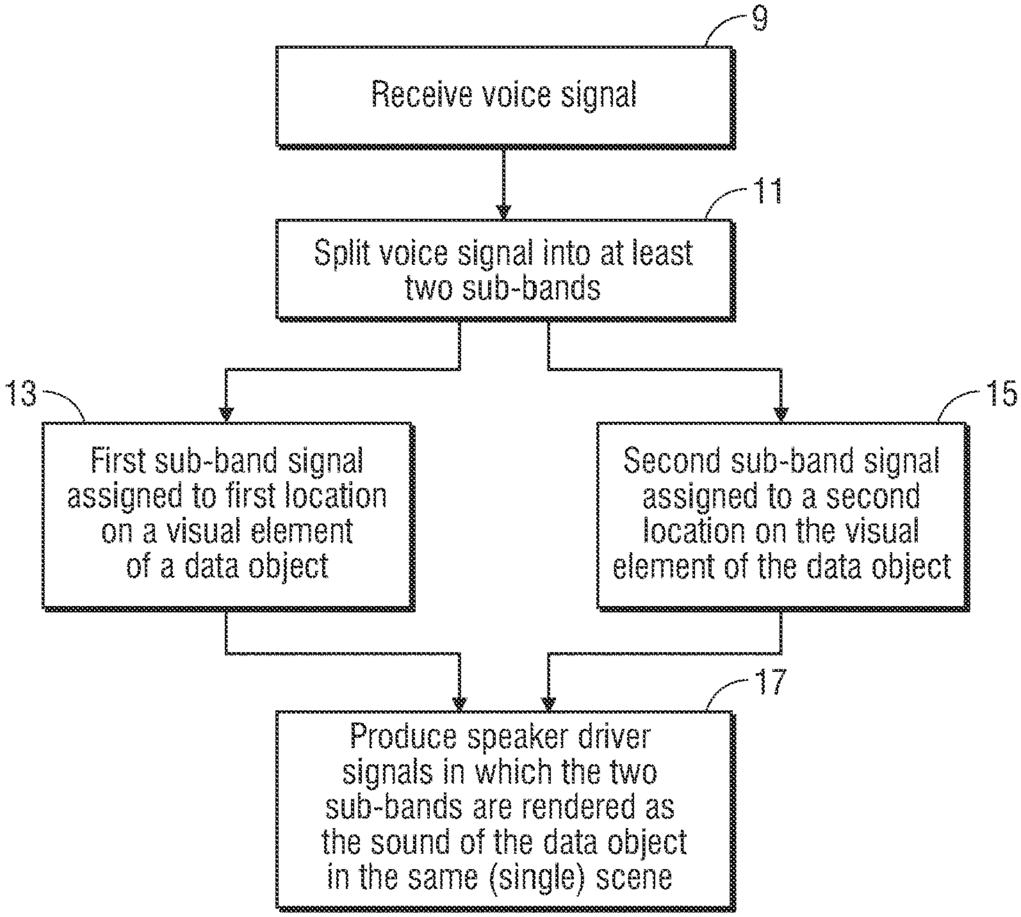
FIG. 3 is a flow diagram of a method for reproducing a voice of a data object, by splitting a voice signal into at least at two sub-bands for separate point sources.

FIG. 3 is a flow diagram of a method for reproducing a voice of a data object, by splitting a voice signal into at least at two sub-bands for separate point sources. The method may be performed by a data processor that has been configured by instructions stored in an article of manufacture and in particular in a machine-readable storage medium (memory.) The method begins with receiving a voice signal of a data object (operation 9) and splitting the voice signal into a first sub-band signal in a first sub-band, and a second sub-band signal in a second sub-band (operation 11.) In one aspect, the processor also assigns the first sub-band signal to a first location of a visual element of a data object (operation 13), and the second sub-band signal to a second location of the visual element (operation 15.) It generates multiple speaker driver signals to reproduce sound of the data object in a single scene (operation 17.) In one instance, a spatialization process generates the speaker driver signals so that sound of the first sub-band signal emanates from a first virtual location and sound of the second sub-band signal emanates from a second virtual location that is different than the first location.

In another instance, rather than spatializing the sound of the data object, sound of the first sub-band signal is produced by a high frequency speaker driver, e.g., a tweeter, while sound of the second sub-band signal is produced by a low frequency speaker driver, e.g., a woofer, of a 2-way or multi-way speaker system. Those speaker drivers may be integrated into the same housing of a listening device such as a laptop computer, a tablet computer, or a head mounted device. In those instances, the listening device also has therein (either integrated or mounted) the display 3.

Another aspect of the disclosure here is to add an audio processing effect into the chain of signal processing being performed upon the sub-band A audio signal (e.g., a high-frequency band being rendered as emanating from the source which in this case is the avatar's mouth) being a frequency-dependent directivity, or a frequency-and-gain dependent directivity. In FIG. 1, this processing effect may be part of the Spatializer A block. This addition will affect the equalization of the voice as the listener moves around the source, e.g., when the listener is behind the avatar as the avatar is talking vs. in front of the avatar. Adding the frequency-dependent directivity effect into the high frequency band processing may result in more realistic rendering of certain phonemes, particularly the vocal fricatives ('f', 'th', 'sh', 's'). Adding the gain-dependent directivity into the high frequency band processing may result in more realistic rendering of different levels of speech production, e.g., by making the speech more directional at louder volumes.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An audio system comprising a data processor configured to spatialize sound that is associated with a visual element that is being display on a display, the processor to:

split an audio signal into a plurality of sub-band audio signals that include a first sub-band signal in a first sub-band, and a second sub-band signal in a second sub-band; and generate a plurality of speaker driver signals by processing the first and second sub-band audio signals so that the first sub-band signal is spatialized to emanate from a first location of the visual element, and the second sub-band signal is spatialized to emanate from a second location of the visual element that is different than the first location.

2. The system of claim 1 wherein to generate the speaker driver signals, the processor spatializes the first sub-band signal as a first virtual sound source that is at a first virtual location, and the second sub-band signal as a second virtual sound source that is at a second virtual location different than the first virtual location.

3. The system of claim 2 wherein the audio signal is a voice signal, and the visual element is an avatar.

4. The system of claim 3 wherein the first location in the avatar is in a head or a mouth, and the second location in the avatar is in a torso.

5. The system of claim 4 wherein the first sub-band is a high frequency band and the second sub-band is a low frequency band, wherein the high frequency band is above the low frequency band.

6. The system of claim 1 wherein the audio signal is a voice signal, and the visual element is an avatar associated with a data object in a simulated reality application.

7. The system of claim 6 wherein the first location in the avatar is in a head or a mouth, and the second location in the avatar is in a torso.

8. The system of claim 7 wherein the first sub-band is a high frequency band and the second sub-band is a low frequency band, wherein the high frequency band is above the low frequency band.

9. The system of claim 8 wherein the processor is configured to perform frequency-dependent directivity processing upon the first sub-band.

10. The system of claim 8 wherein the processor is configured to perform gain-dependent directivity processing upon the first sub-band.

11. The system of claim 1 wherein the processor is to:

receive an acoustic characteristic of a virtual room in which the visual element is presented on a display, or of a real room in which a listener of the spatialized sound is located; and set one or more cut off frequencies of the plurality of sub-band audio signals based on the acoustic characteristic.

12. The system of claim 11 wherein the acoustic characteristic comprises a room size or room volume.

13. A method for reproducing sound of a data object, the method comprising:

splitting a voice signal of a data object into a first sub-band signal in a first sub-band, and a second sub-band signal in a second sub-band; and generating a plurality of speaker driver signals to produce sound of the object by a two-way speaker system, by processing the first sub-band signal into a tweeter or high frequency driver signal for the two-way speaker system, and the second sub-band signal into a woofer or low frequency driver signal for the two-way speaker system.

14. The method of claim 13 wherein the data object is associated with a visual element in a simulated reality application program, the visual element being an avatar.

15. The method of claim 13 wherein the first sub-band is a high frequency band and the second sub-band is a low frequency band, wherein the high frequency band is above the low frequency band.

16. An article of manufacture comprising a machine-readable storage medium having stored therein instructions that configure a processor to:

split a voice signal into a first sub-band signal in a first sub-band, and a second sub-band signal in a second sub-band; and generate a plurality of speaker driver signals to reproduce sound of the voice signal, in which sound of the first sub-band signal is produced by a first speaker driver and sound of the second sub-band signal is produced by a second speaker driver.

17. The article of manufacture of claim 16 wherein the first speaker driver is at a tweeter and the second speaker driver is a woofer.

18. The article of manufacture of claim 17 wherein the voice signal is that of an avatar that is being displayed on a display.

19. The article of manufacture of claim 18 wherein the first sub-band is a high frequency band and the second sub-band is a low frequency band, wherein the high frequency band is above the low frequency band.

20. The article of manufacture of claim 18 further comprising instructions that configure the processor to:

receive an acoustic characteristic of a virtual room in which the avatar is presented on the display, or a real room in which a listener of the reproduced sound is located; and setting one or more cut off frequencies of the first sub-band and the second sub-band based on the acoustic characteristic.

21. The article of manufacture of claim 20 wherein the acoustic characteristic comprises a room size or room volume.

* * * * *